United States Patent [19]

Camuffo

[11] Patent Number: 5,139,361
[45] Date of Patent: Aug. 18, 1992

[54] DEVICE FOR CONNECTING MECHANICAL PARTS TO THE BODY OF A MOTOR VEHICLE

[75] Inventor: Sergio Camuffo, Turin, Italy
[73] Assignee: Fiat Auto SpA, Turin, Italy
[21] Appl. No.: 651,861
[22] Filed: Feb. 7, 1991

[30] Foreign Application Priority Data

May 8, 1990 [IT] Italy ................................ 67341 A/90

[51] Int. Cl.⁵ ............................................. F16B 39/22
[52] U.S. Cl. .................................... 403/408.1; 411/338
[58] Field of Search ............... 403/408.1, 407.1, 13, 403/225, 227, 228; 411/339, 338, 171, 34, 546

[56] References Cited

U.S. PATENT DOCUMENTS

| | | | |
|---|---|---|---|
| 4,014,588 | 3/1977 | Kohriyama | 403/225 X |
| 4,238,165 | 12/1980 | Wagner | 403/408.1 |
| 4,684,286 | 8/1987 | Itagaki | 403/407.1 |
| 4,732,519 | 3/1988 | Wagner | 403/408.1 X |
| 4,850,771 | 7/1989 | Hurd | 403/408.1 X |
| 5,040,917 | 8/1991 | Camuffo | 403/408.1 |

*Primary Examiner*—Peter M. Cuomo
*Attorney, Agent, or Firm*—Sughrue, Mion, Zinn, Macpeak & Seas

[57] ABSTRACT

A device for screwing to the floor from below, a mechanical part which has previously been placed against the underside of the floor of a motor vehicle body, provides for the mechanical part which is to be connected to be arranged so that at least one reference pin projects upwardly to engage a corresponding reference hole in a wall of the body floor from below. The reference pin has a through-hole. A sleeve with an upper end portion of smaller diameter is fixed to the upper side of the wall of the body floor, coaxially with the reference hole, and defines a threaded hole for engagement by a screw which can be inserted through the hole in the reference pin from beneath. The sleeve also includes a base portion of larger diameter for receiving the outer surface of the part of the reference pin which projects above the wall of the floor through the reference hole so as to allow the centering of the threaded hole which is to be engaged by the screw with the hole in the reference pin. When the mechanical part has to be connected to the floor with the interposition of a block of elastomeric material, the reference pin may be an integral part of the metal reinforcement of the block.

4 Claims, 2 Drawing Sheets

DEVICE FOR CONNECTING MECHANICAL PARTS TO THE BODY OF A MOTOR VEHICLE

BACKGROUND OF THE INVENTION

The present invention relates to a device for connecting a mechanical part which has previously been placed against the underside of the floor of a motor vehicle to the floor by screwing from below.

Recently, a tendency has developed in the art to pre-assemble the mechanical components of a motor vehicle, such as, for example, the suspension members, usually by the assembly of the various parts on auxiliary, pre-assembly frames, and then to mount the auxiliary frames carrying the pre-assembled unit on the motor vehicle body with automatic equipment. One example of an embodiment of this type, which relates to the case of a rear suspension system mounted beneath the floor of the motor vehicle body from below, is illustrated in the earlier European patent application no. EP-A-O 373 125 filed by the same Applicant and designating the same inventor as in the present application. In embodiments of this type, the fixing of the pre-assembled system under the floor of the motor vehicle body is effected by screwing from beneath with the aid of automatic screwing devices.

SUMMARY OF THE INVENTION

The object of the present invention is to provide a connecting device which enables the pre-assembled system to be assembled on the body in a particularly simple and easy manner, whether directly or with the interposition of elastic bushes and with the aid of automatic screwing devices.

In order to achieve this object, the invention provides a device for connecting a mechanical part which has previously been placed against the underside of the floor of a motor vehicle body to the floor by screwing from below, characterised by the combination of the following characteristics:

a) the mechanical part to be connected carries at least one reference pin projecting upwardly and arranged for insertion through a corresponding reference hole in a wall of the floor from beneath, b) the reference pin has a through-hole, c) a sleeve is fixed above the wall of the floor, coaxially with the reference hole, and has an upper end portion of smaller diameter defining a threaded hole for engagement by a screw which can be inserted through the hole in the reference pin from beneath, and a base portion of larger diameter arranged to receive the outer surface of the part of the reference pin which projects above the wall of the floor through the reference hole so as to allow the centering of the threaded hole with the hole in the reference pin.

This said arrangement can also be used when the mechanical part to be connected has to be fixed to the body with the interposition of an elastic block. In this case, the reference pin may be an integral part of the metallic reinforcement of the block.

As will become apparent from the description above, a characteristic of the device according to the invention is that the reference pins used to centre the mechanical parts on the body also constitute part of the fixing device. The device enables the elements to be assembled and positioned correctly without the need for further reference parts.

BRIEF DESCRIPTION OF THE DRAWINGS

Further characteristics and advantages of the invention will become apparent from the description which follows with reference to the appended drawings, provided purely by way of non-limiting example, in which.

DETAILED DESCRIPTION OF THE INVENTION

Figure 1:
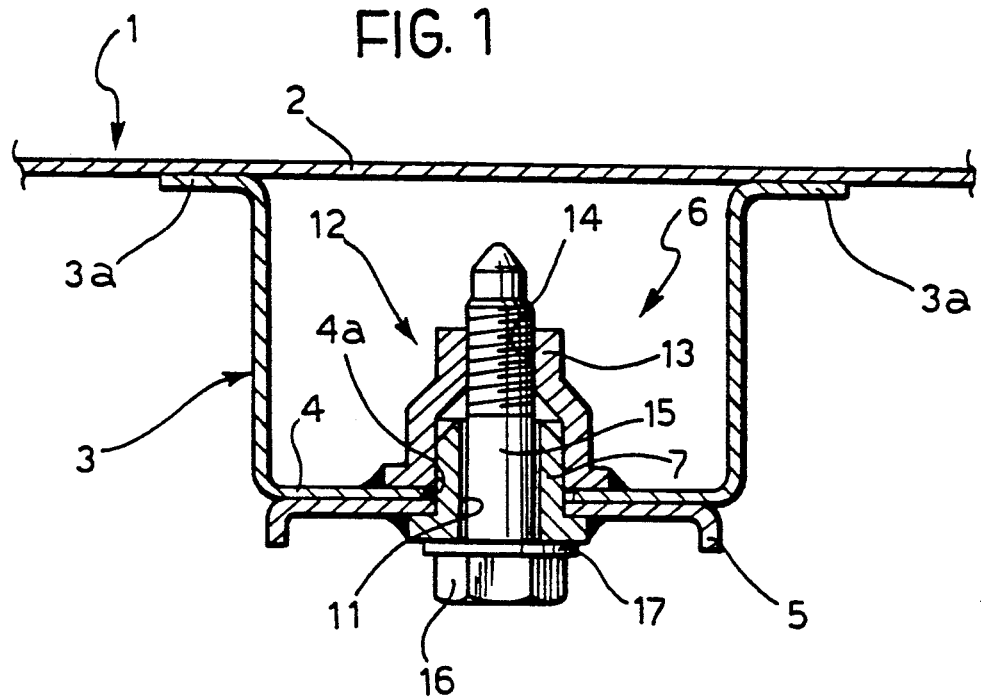
FIG. 1 is a cross-section of a first embodiment of a connecting device of the invention.

With reference to FIG. 1, part of the floor of a motor vehicle body is indicated 1 and includes a flat panel 2 and a longitudinal member 3 constituted by a profiled section with longitudinal flanges 3a welded to the flat panel 2 and a central longitudinal wall 4. A mechanical part 5, for example, a metal sheet forming part of a pre-assembled frame on which the rear suspension of the motor vehicle has been assembled, is fixed to the wall 4 by a device 6 according to the present invention.

Figure 2:
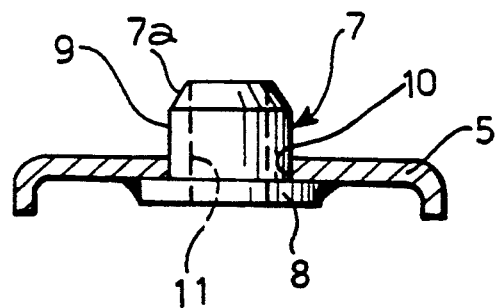
FIG. 2 shows part of the device of FIG. 1.
Figure 3:
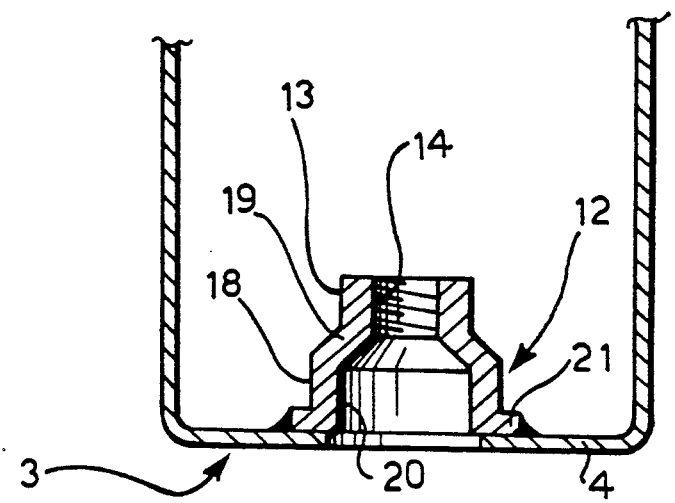
FIG. 3 illustrates a further part of the device of FIG. 1.

With reference to FIG. 2 as well, the device 6 includes a reference pin 7 having at its lower end a head 8 welded to the sheet 5 and having a shank 9 inserted through a hole 10 in the sheet 5. Naturally, the reference pin 7 may be fixed to the sheet 5 in any other manner, for example by interference. The reference pin 7 has an axial through-hole 11.

The device further includes a sleeve 12 having an upper end portion 13 of smaller diameter whose inner surface defines a threaded hole 14 for engagement by a fixing screw 15 intended to be inserted through the hole 11 in the reference pin 7 from below and having a head 16 which bears against the head 8 of the reference pin 7 with the interposition of a washer 17. The sleeve 12 further includes a base portion 18 of larger diameter which is connected to the portion 13 by an intermediate conical portion 19. The inner cylindrical surface 20 of the base portion 18 of the sleeve 12 is arranged to receive the outer surface of the part of the reference pin 7 which projects above the sheet 5. In order to facilitate this reception, the end portion of the pin 7 has an outer frusto-conical surface 7a. The sleeve 12 opens above the reference pin 7 to enable the automatic centering of the threaded hole 14 with the through-hole 11 in the reference pin 7 so as to enable the screw 15 to engage the threaded hole 14 correctly on assembly. Finally, the sleeve 12 has an annular base flange 21 which is welded to the inner surface of the wall 4. The fact that the sleeve 13 bears against the wall 4 through the annular flange, together with the fact that the reference pin 7 bears against the wall 5 through the head 8, enables the load exerted by the screw 15 to be transferred to a relatively extensive bearing surface once it has been tightened. The traction exerted by the bolt is thus divided satisfactorily between the various parts of the connection. The pull of the bolt thus has good elasticity and hence the fixing is reliable.

As already mentioned above, the reference pins 7, as well as fulfilling the function of providing easy centering of the mechanical part on the body, also constitute an integral part of the connecting device.

Finally, the fitting of the sleeve 12 onto the reference pin 7 makes the assembly and the fixing by means of the screw 15 quick and easy.

Figure 4:
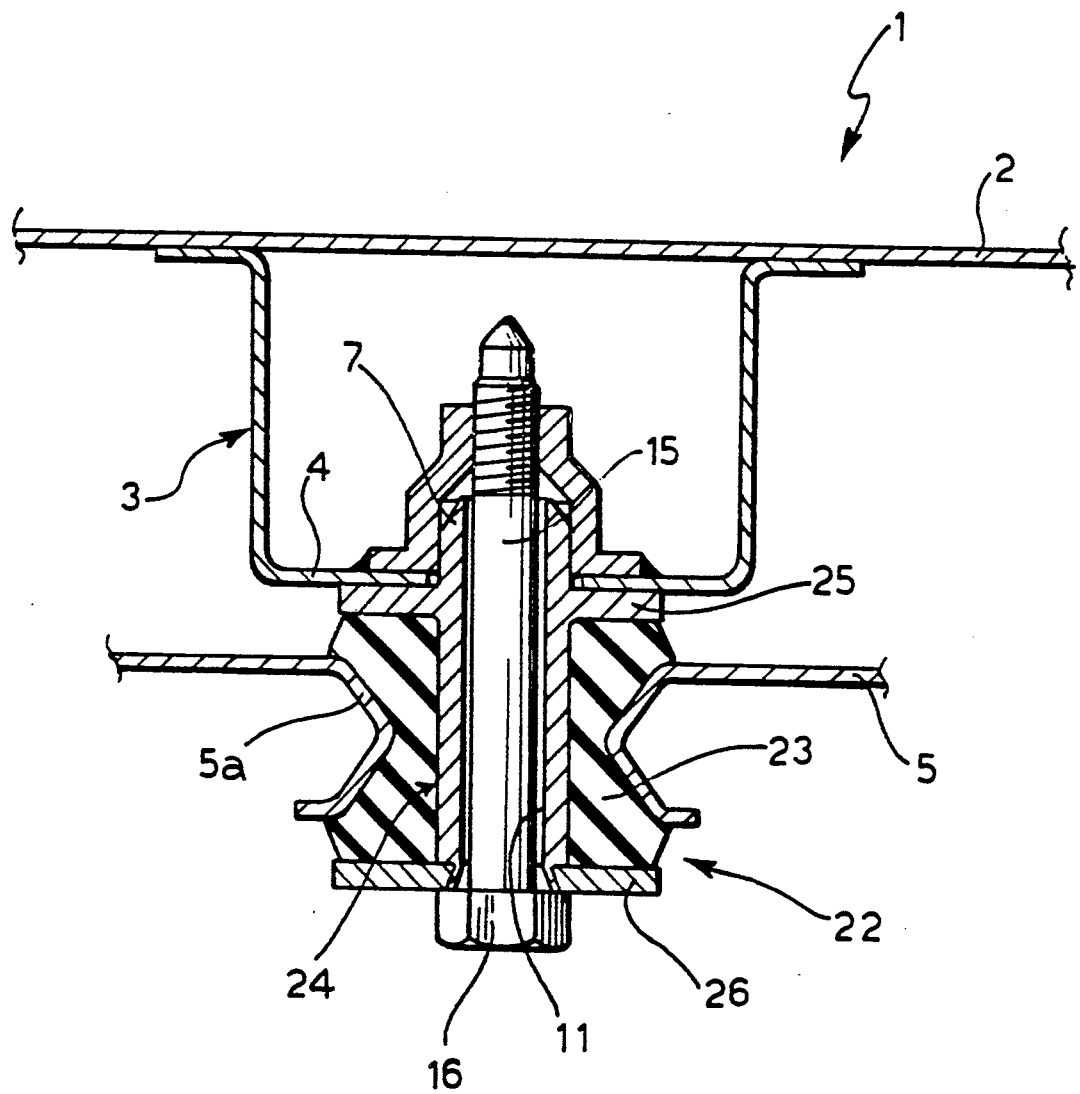
FIG. 4 illustrates a second embodiment of the device of the invention.

FIG. 4 relates to the case in which the mechanical part 5 has to be fixed to the wall 4 with the interposition of a rubber block 22. The rubber block 22 comprises an annular rubber member 23 the outer surface of which is vulcanised onto an annular appendage 5a of the part 5 and the inner surface of which is vulcanised onto a tubular metal reinforcement 24 having an end ring 25. In this case, the reference pin 7 constitutes an integral part of the reinforcement 24. The screw 15 passes through and is longer than the hole 11 in the reinforcement 24. The head 16 of the screw 15 bears against the end surface of the rubber ring 23 with the interposition of the metal plate 26.

Naturally, the principle of the invention remaining the same, the constructional details and forms of embodiment may be varied widely with respect to those described and illustrated without thereby departing from the scope of the present invention.

What is claimed is:

1. Means for connecting a mechanical part to the under side of the floor of a motor-vehicle body by screwing from below, comprising:
   a wall fixed to and beneath said floor in spaced relation thereto and defining a hole in said wall;
   a sleeve fixed to the upper side of said wall between said wall and said floor coaxially with said hole, said sleeve defining a cavity having a larger-diameter lower portion opening to said hole and a smaller-diameter, upper, threaded portion;
   a reference pin carried by said mechanical part and arranged so as to project upwardly to be inserted through said hole from below and to seat in said larger diameter portion of said sleeve cavity, said reference pin defining an axial through-hole; and
   a screw which is adapted to be inserted upwardly through said through-hole in said reference pin when seated in said sleeve cavity to engage said threaded portion of said cavity, the seating of the reference pin in the larger-diameter portion of said sleeve cavity ensuring the centering of the through-hole in said pin with said threaded portion of said sleeve cavity.

2. Means as claimed in claim 1, wherein said mechanical part defines and aperture and said reference pin has a head and a shank, said shank being insertible through said aperture so that said head abuts the mechanical part around the aperture and wherein the free end of said shank has a conical taper.

3. Means as claimed in claim 1, wherein said sleeve has an annular base flange and said sleeve is fixed to said upper side of said wall by means of said base flange.

4. Means as claimed in claim 1, further including an elastic block with an internal metal reinforcement for interposition between said mechanical part and said wall, wherein said reference pin constitutes an integral part of said metal reinforcement.

* * * * *